United States Patent [19]

Price

[11] 3,863,402

[45] Feb. 4, 1975

[54] WORKPIECE ORIENTING DEVICE FOR A MACHINE TOOL

[75] Inventor: Ralph E. Price, Waynesboro, Pa.

[73] Assignee: Landis Tool Company, Waynesboro, Pa.

[22] Filed: Feb. 1, 1974

[21] Appl. No.: 438,549

[52] U.S. Cl...... 51/216 ND, 51/215 HM, 51/215 H, 51/237 CS, 221/173
[51] Int. Cl....... B24b 49/08, B24b 5/16, B65h 9/08
[58] Field of Search ...... 51/103 R, 103 C, 103 WH, 51/105 EC, 215 H, 215 HM, 216 ND, 237 CS; 221/173

[56] References Cited
UNITED STATES PATENTS

| | | | |
|---|---|---|---|
| 3,390,812 | 7/1968 | Bono | 221/173 |
| 3,583,108 | 6/1971 | Aishi et al. | 51/237 CS |
| 3,665,656 | 5/1972 | Newsome | 51/215 H |

*Primary Examiner*—Al Lawrence Smith
*Assistant Examiner*—Marc R. Davidson
*Attorney, Agent, or Firm*—Spencer T. Smith

[57] ABSTRACT

A workpiece orienting device comprising means for supporting a randomly oriented workpiece, having an eccentric portion to be ground to size for selective engagement with a pair of work centers, a pair of work centers, means for forcefully engaging a supported workpiece with the work centers, motor means for rotatably driving at least one of the work centers, an orienting finger selectively located to be radially aligned with the eccentric portion of a supported workpiece and displaceable from a retracted remote position to an advanced position, the advanced position being selectively located so that the eccentric portion of the rotating workpiece will strike the orienting finger at a predetermined peripheral location, means for advancing the orienting finger from the retracted position to the advanced position, means for sensing when the orienting finger can be advanced from the retracted position to the advanced position without abutting against the eccentric portion and for actuating the advancing means, and means for maintaining the orienting finger at the advanced position whereby rotation of the rotating workpiece will be halted when the eccentric portion strikes the orienting finger thereby establishing a predetermined workpiece orientation.

4 Claims, 3 Drawing Figures

Fig_1

WORKPIECE ORIENTING DEVICE FOR A MACHINE TOOL

The present invention relates to a device for angularly orienting workpieces having an offset concentric diameter or an eccentric portion. Cylindrical workpieces are oriented to predetermined angular positions from random positions prior to a machining operation on machine tools, such as cam or piston grinders for grinding camshafts or pistons having eliptical contours to a predetermined size.

The work orienting device is particularly adapted for use in orienting a workpiece such as a camshaft which is not supplied with an extended portion or keyway for determining the correct angular position of the camshaft.

The work orienting device may be used in combination with an automatic work loader which may utilize a swinging type loader arm to transport workpieces to the grinding machine after they have been properly oriented angularly.

Prior to this invention, removable driving dogs were angularly positioned on one end of the workpiece in a predetermined angular position with respect to the eccentric portion of the shaft to angularly align the workpiece with the cam contour of the headstock spindle and the master cam. This procedure is time consuming and therefor is economically undersirable.

It is therefore, an object of the present invention to provide a work orienting device for automatically orienting camshafts from random angular positions without manual handling by the machine operator.

Another object is to increase the production capability of the machine tool by guaranteeing an absolute angular position of each camshaft.

Other objects and advantages of the present invention will become apparent from the following portion of this specification and from the accompanying drawings which illustrate, in accordance with the mandate of the patent statutes, a presently preferred embodiment incorporating the teachings of the invention.

Referring to the drawings.

Figure 1:
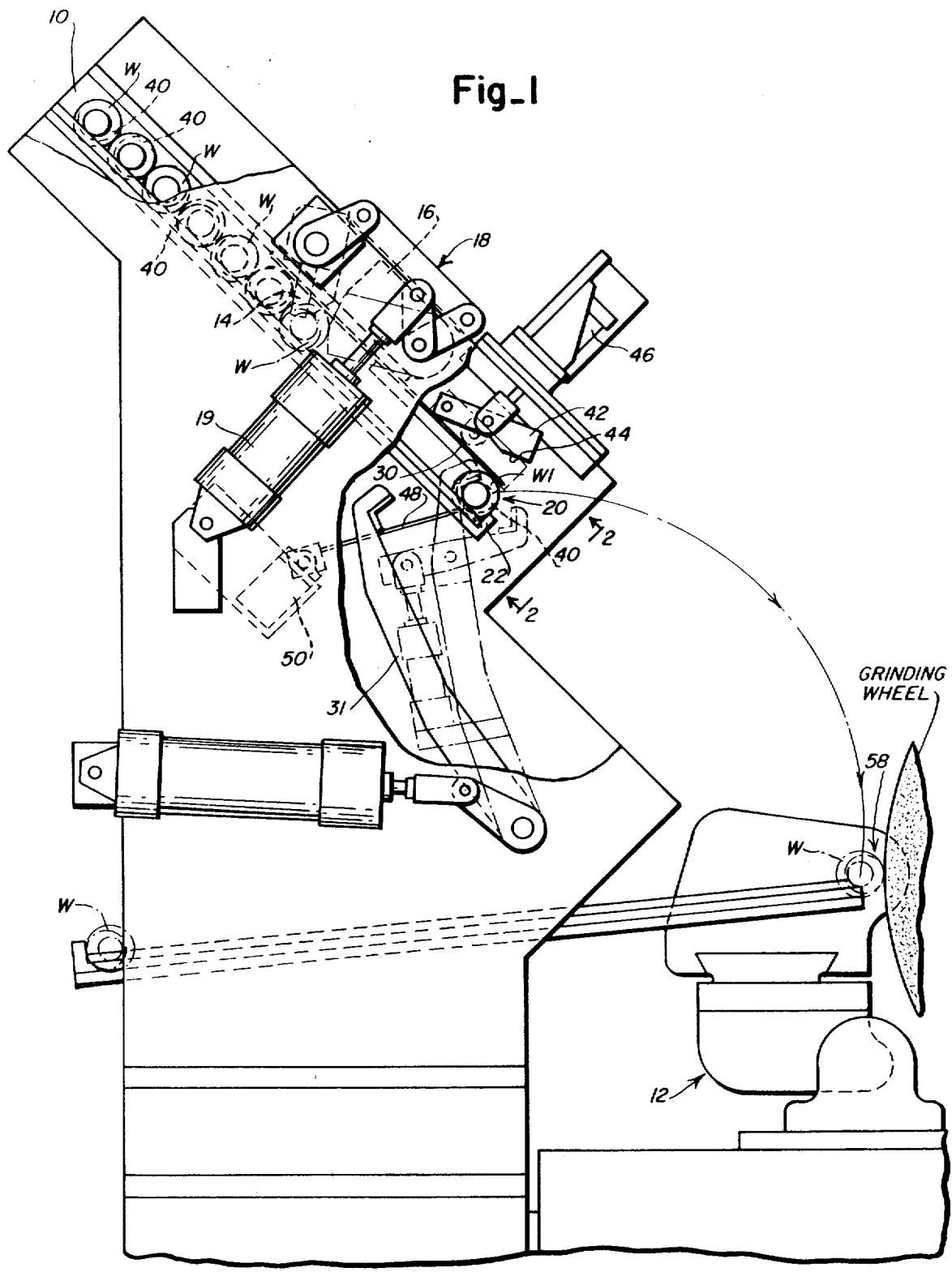
FIG. 1 is a side elevational view of a loader assembly including an orienting device made in accordance with the teachings of the present invention.

Referring now to the drawings in detail, there is illustrated in FIG. 1, a workloading chute 10 of a loader assembly for a grinding machine 12, wherein a number of like workpieces W are received between a pair of spaced rails. The workpieces W are sequentially located against a suitable stop member 14 which is connected to escapement members 16 through a linkage mechanism 18. The escapement members 16 are raised by a hydraulic motor or cylinder 19 to permit a single workpiece W1 to be advanced into the orienting station 20.

The advanced workpiece W1 is retained in this position by a pair of spaced end stops 22,24 (FIG. 2), which retain the work piece W1 in alignment with a pair of axially spaced work centers 26,28.

Figure 2:
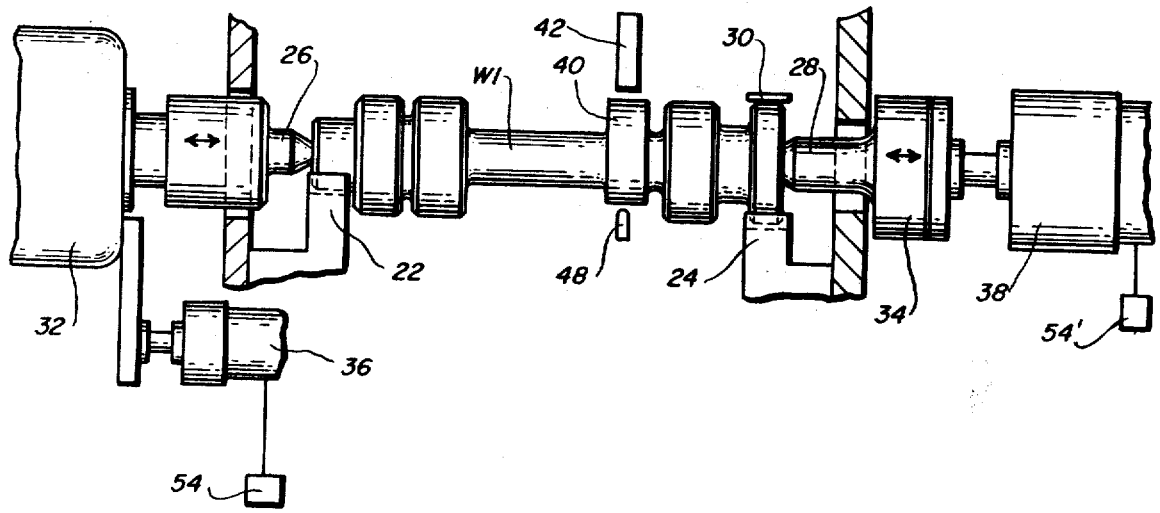
FIG. 2 is an enlarged fragmentary transverse view taken along line 2—2 of FIG. 1.

A spring steel retaining strip 30 as shown in FIGS. 1 and 2 may be used to guide the sucessive workpieces into the orienting position and to retard any intermittent bouncing thereof. The strip 30 has a length selected to permit the workpiece W1 to be transported to the grinding station by a swinging type loader arm 31.

The left-hand work center 26 is rotatably supported and slowly driven by a continuously operating rotary hydraulic motor 32 and the other work center 28 is rotatably supported by the housing 34. The work centers 26 and 28 are axially advanced into engagement with the adjacent ends of the advanced workpiece W1 by suitable cylinders 36 and 38 respectively, when a part-present switch (not shown) is energized.

The engaged workpiece W1 will accordingly begin to slowly rotate as soon as sufficient frictional pressure is exerted by the rotating work center 26.

Each workpiece W includes a radially offset concentric or eccentric portion 40 such as a cam surface on a camshaft which must be angularly located at a predetermined angular position prior to grinding to align the eccentric portion 40 relative to the headstock spindle and the master cam to insure that sufficient stock will be present during the grinding operation.

Since the workpieces W are conventionally manually placed in the work loading chute the eccentric portions 40 are randomly oriented when they reach the orienting station 20.

Figure 3:
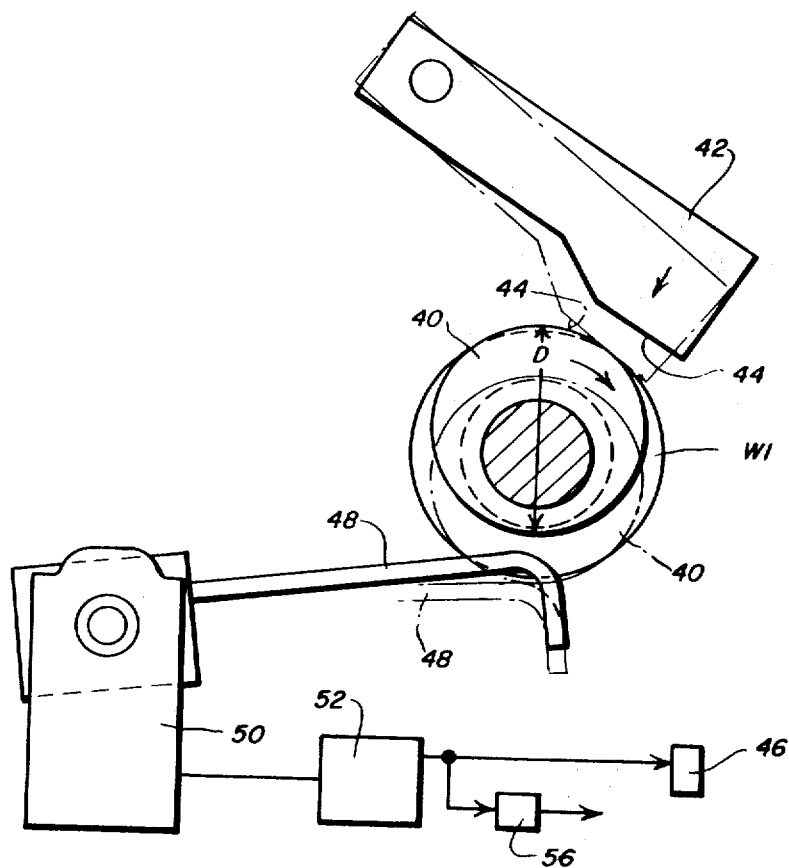
FIG. 3 is an enlarged end view of the workpiece and shows the orienting finger and control mechanism illustrated in FIG. 1.

The rotative displacement of the engaged workpiece W1 is selectively terminated by an orienting finger 42, which is radially aligned with the eccentric portion 40. The orienting finger 42 includes a bearing surface 44 which will engage the periphery of the eccentric portion 40 after the finger 42 has been pivotally displaced by a hydraulic motor or cylinder 46 to an advanced position illustrated in broken lines in FIG. 3. The advanced orienting finger 42 intersects the path of the rotating eccentric portion 40 to forcefully engage and thereby prevent the further rotation of the workpiece when the workpiece is at a selected orientation and retain the eccentric portion 40 at that precise angular orientation (FIG. 3).

The orienting finger 42 is not advanced until the workpiece has been rotatively displaced two full revolutions. The major diameter (D) of the eccentric portion 40 is sensed by an operating lever 48 of a limit switch 50, which is located in the path of the major diameter (D). The limit switch 50 must receive double signals which may be counted by a counter in the control unit 52 to insure that the workpiece W1 is properly mounted and sufficiently rotated before the hydraulic motor is energized to fully advance the locating finger without abutting against the eccentric portion.

The hydraulic pressure which advances the work centers 26 and 28 may be varied by varying at least one of a pair of regulating control valves 54,54' so that the frictional force between the driving work center 26 and the workpiece W1 will be overcome when rotation of the eccentric portion 40 is brought to a halt by the forceful engagement of the advanced orienting finger 42.

A timer 56 is energized when the counter counts out to provide a timed interval for completing the orientation function after which the loader arm 31 will be advanced to grip the properly oriented workpiece W1. The work centers 26,28 orienting finger 42 are then simultaneously retracted to restate the orienting mechanism at its initial condition.

The loader arm 31 will transfer the clamped workpiece W1 from the orienting station 20 to the grinding station 58 of the grinding machine 12. The tailstock work center (not shown) will be advanced following the unclamping of the workpiece by the loader arm 31 and the grinding operation will be initiated in a conventional manner. The loader arm 31 illustrated in FIG. 1 is similar to the loader arm shown and described in U.S. Pat. No. 3,667,167 granted June 6, 1972.

While the invention has been disclosed with reference to a workpiece orienting device for a work loader for a cam grinding machine it has equal applicability for a piston grinding machine or for any machine tool, wherein a machining operation must be performed at a predetermined angular position on a workpiece which includes at least one radially offset concentric diameter or an eccentric diameter.

Additionally while in the preferred embodiment the orienting device is located in a discrete loader assembly, it is within the teachings of the present invention to make the orienting device an integral portion of the grinding machine, thereby combining the orienting and grinding zones.

What is claimed is:

1. A workpiece orienting device comprising means for supporting a randomly oriented workpiece, having an eccentric portion to be ground to size, for selective engagement with a pair of work centers, a pair of work centers, means for forcefully engaging a supported workpiece with said work centers, motor means for rotatably driving at least one of said work centers, orienting means selectively located to be radially aligned with the eccentric portion of a supported workpiece and displaceable from a retracted remote position to an advanced position, said advanced position being selectively located so that the eccentric portion of the rotating workpiece will strike said orienting means at a predetermined location, means for advancing said orienting means from said retracted position to said advanced position, means for sensing when said orienting means can be advanced from said retracted position to said advanced position without abutting against the eccentric portion, and for actuating said advancing means, means for maintaining said orienting means at said advanced position whereby rotation of the rotating workpiece will be halted when the eccentric portion engages said orienting means thereby establishing a predetermined workpiece orientation.

2. A workpiece orienting device according to claim 1, wherein said engaging means includes means for selectively controlling the amount of force applied to the workpiece by said engaging means, whereby rotation of said one of said work centers may continue after the rotation of a workpiece has been halted by said orienting means.

3. A workpiece orienting device according to claim 1, wherein said advancing means includes a hydraulic cylinder.

4. A workpiece orienting device according to claim 1, wherein said sensing and actuating means comprises a switch including an operating lever radially aligned with the eccentric workpiece portion.

* * * * *